INVENTORS
PETRUS J. VAN GERWEN
FRANK DE JAGER
BY
Frank R. Trifari
AGENT

INVENTORS
PETRUS J. VAN GERWEN
FRANK DE JAGER
BY
Frank R. Jifari
AGENT

INVENTORS
PETRUS J. VAN GERWEN
FRANK DE JAGER
BY
Frank R. Jifani
AGENT

INVENTORS
PETRUS J. VAN GERWEN
FRANK DE JAGER
BY
Frank R. Jifari
AGENT

INVENTORS
PETRUS J. VAN GERWEN
FRANK DE JAGER
BY
[signature]
AGENT

INVENTORS
PETRUS J. VAN GERWEN
FRANK DE JAGER
BY
Frank R. Jifari
AGENT

INVENTORS
PETRUS J. VAN GERWEN
FRANK DE JAGER
BY
Frank R. Jifani
AGENT

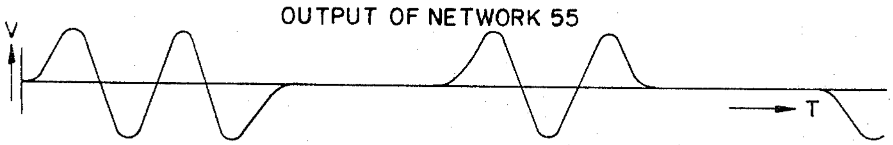
FIG. 15a
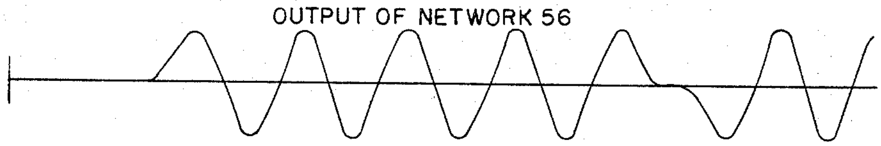
FIG. 15b
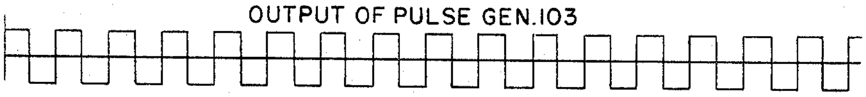
FIG. 15c
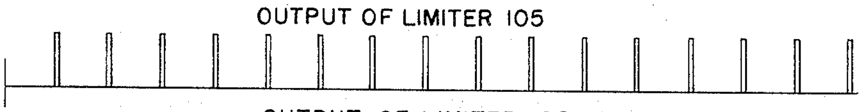
FIG. 15d
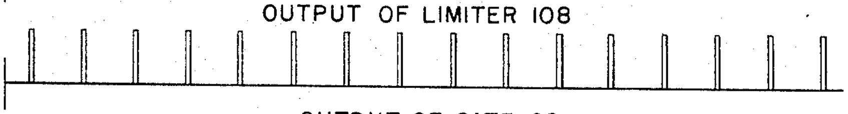
FIG. 15e
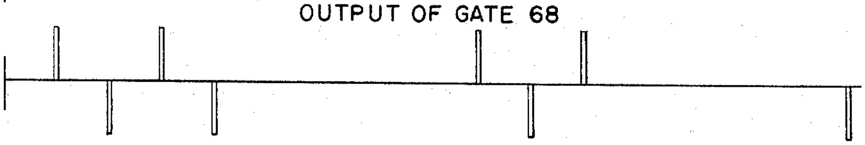
FIG. 15f
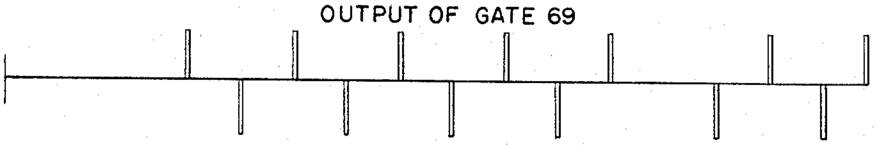
FIG. 15g
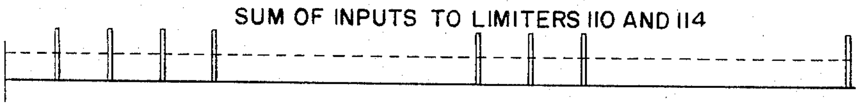
FIG. 15h
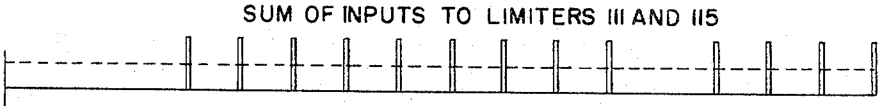
FIG. 15i
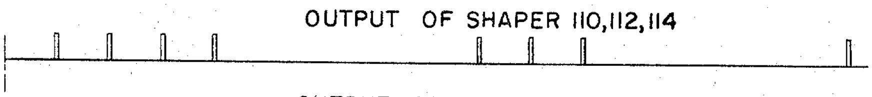
FIG. 15j
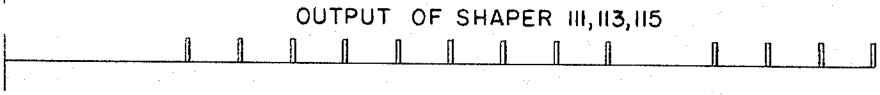
FIG. 15k
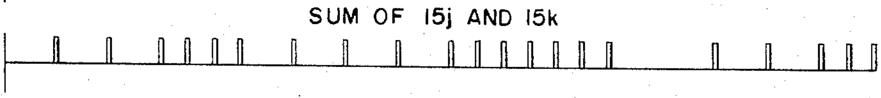
FIG. 15ℓ
*INVENTORS*
PETRUS J. VAN GERWEN
FRANK DEJAGER 3,378,771

QUADRATURE MODULATION PULSE TRANSMISSION SYSTEM WITH IMPROVED PULSE REGENERATION AT RECEIVER

Petrus Josephus Van Gerwen and Frank de Jager, Emmasingel, Eindhoven, Netherlands, assignors to North American Philips Company, Inc., New York, N.Y., a corporation of Delaware Filed May 28, 1964, Ser. No. 371,062
Claims priority, application Netherlands, June 21, 1963, 294,442
11 Claims. (Cl. 325—42)

ABSTRACT OF THE DISCLOSURE

A pulse transmission system for the transmission of pulses occurring at clock instants. The transmitter has two channels, the outputs of which are modulated on a common carrier at a relative phase of 90 degrees. At least one of the transmitter channels has a direct current suppressor. The receiver receives and demodulates the signals corresponding to the two channels. A demodulated signal corresponding to a transmitter channel having direct current suppression is passed through a filter network. The sum of the characteristics of the filter network and suppressor is the equivalent of a subtracting network to which signals are applied directly and by way of a delay network.

The invention relates to a pulse signal transmission system operating a specified transmission band, particularly for the transmission of pulses. The instants of occurrence of the pulses are determined by a sequence of equidistant timing pulses, for example in synchronous telegraphy or pulse code modulation. At the transmitter the pulse signals are transmitted as the modulation of a carrier oscillation through a transmission path to the receiver, where the pulse signals are recovered by demodulation and caused to control a pulse shaper.

In United States Patent No. 3,311,442 and United States application Ser. No. 295,061 filed July 15, 1963, particularly advantageous devices of the kind set forth are described for the transmission of maximum pulse information in the prescribed transmission band. The transmitting device comprises two channels having modulators connected to a common carrier oscillation and modulating the pulse signals of these channels on the common carrier oscillation with a relative phase shift of 90°. At least one of the transmitter channels (first transmitter channel) is provided with a network for suppressing the direct-current component of the pulse signals occurring in said channel. The pulse signals of the two channels, thus modulated on the common carrier together with a pilot oscillation of carrier frequency are transmitted through the transmission path. The receiving device comprises two receiving channels each including a demodulation device and a pulse shaper formed by a pulse regenerator. At least the demodulation device of the receiving channel corresponding with the first transmitter channel receives a local carrier oscillation derived from the transmitted pilot signal for the demodulation of the pulse signals transmitted with suppressed direct-current component.

In order to receive the pulse signals transmitted with suppressed DC component use is made in the system of Patent 3,311,442 of a pulse shaper formed by a pulse regenerator provided with a feedback network formed by a low-bandpass filter connected between the input circuit and the output circuit and having a time constant of the same order as the time constant of the network employed in the first transmitter channel and suppressing the D.C. component. According to the Patent Application Ser. No. 295,061, now U.S. Patent No. 3,343,093, this is achieved by adding to the first transmitter channel an auxiliary transmitter channel fed by the pulse signals of the first transmitter channel and comprising a modulator with a carrier oscillator and a network passing only the D.C. component of the pulse signals. The D.C. component is applied in the modulator to an extreme transmission band lying beyond the central transmission band of the two transmitter channels to the common transmission path. The receiving device comprises apart from the channel corresponding with the first transmitter channel an auxiliary receiving channel for receiving the signal transmitted in the extreme band. The auxiliary channel includes the demodulation device, the output signal of which is applied together with the output signal of the receiving channel concerned, through an adding device, for pulse regeneration to the pulse regenerator concerned. The two systems described above have the important advantages that maximum pulse information is transmitted with optimum freedom of interferences.

The invention is based on a different concept of a pulse transmission system of the kind set forth, in which the optimum freedom of interferences and maximum pulse information transmission are maintained but the structure is considerably simplified.

According to the invention the transmitter device comprises two channels having modulators connected to a common carrier oscillator, said modulators modulating the pulse signals of said channels on the common carrier oscillation with a relative phase shift of 90°. At least one of the transmitter channels is provided with a network for suppressing the direct-current component of the pulse signals of said channel. The pulse signals of the two channels thus modulated on the common carrier are transmitted, together with a pilot oscillation of the carrier frequency, via the transmission path. The receiving device is provided with two receiving channels each having a demodulation device and a subsequent pulse shaper. At least the demodulation device of the receiving channel corresponding to the first transmitter channel receives a local carrier oscillation obtained from the transmitted pilot signal for the demodulation of the pulse signals transmitted with suppressed D.C. component, said pulse signals being applied to the pulse shaper. The receiving channel corresponding to the first transmitter channels includes a complementary network, the frequency curve of which together with that of the D.C. suppressing network on the transmitter side behaves, at least up to half the pulse repetition frequency, like a network consisting of a subtraction device to which the incoming signals are applied directly and through a delay network, whilst the subsequent pulse shaper has two different response values.

In a particularly advantageous embodiment each of the transmitter channels includes a D.C. suppressing network, and at the receiver the local carrier frequency is applied to each of the demodulation devices in the two receiving channels for the demodulation of the pulse signals transmitted with D.C.-suppression. Each of the receiving channels has a complementary network and a pulse shaper having two different response values.

The invention and its advantages will now be described more fully with reference to the figures.

FIGS. 1 and 2 show a transmitting device and a receiving device for use in a pulse transmission system according to the invention.

FIGS. 3*a*–3*g* and 4*a*–4*f* show some time diagrams for explaining the transmitting and receiving devices of FIGS. 1 and 2.

Figure 12:
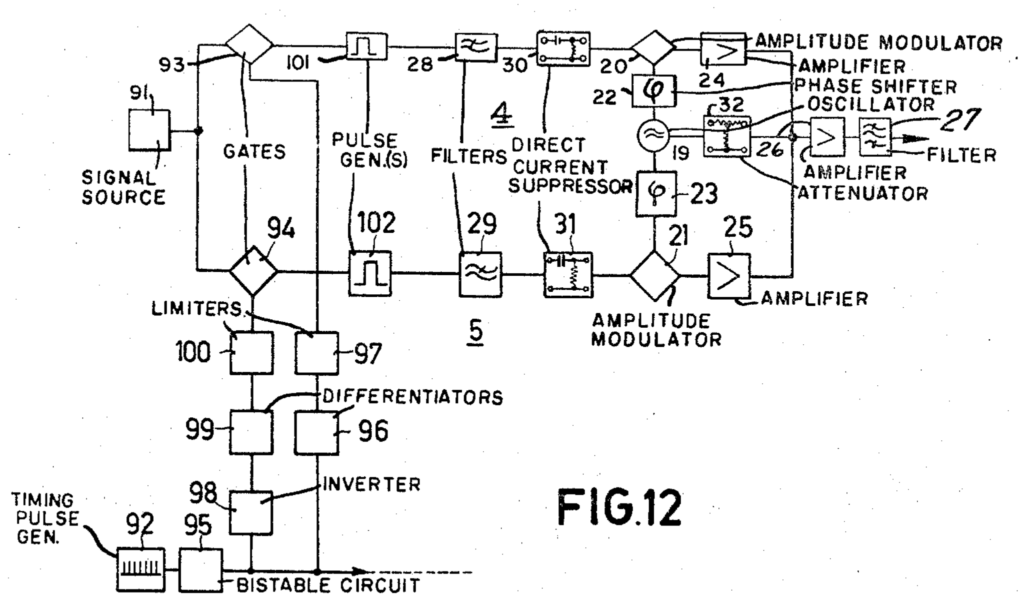
Figure 13:
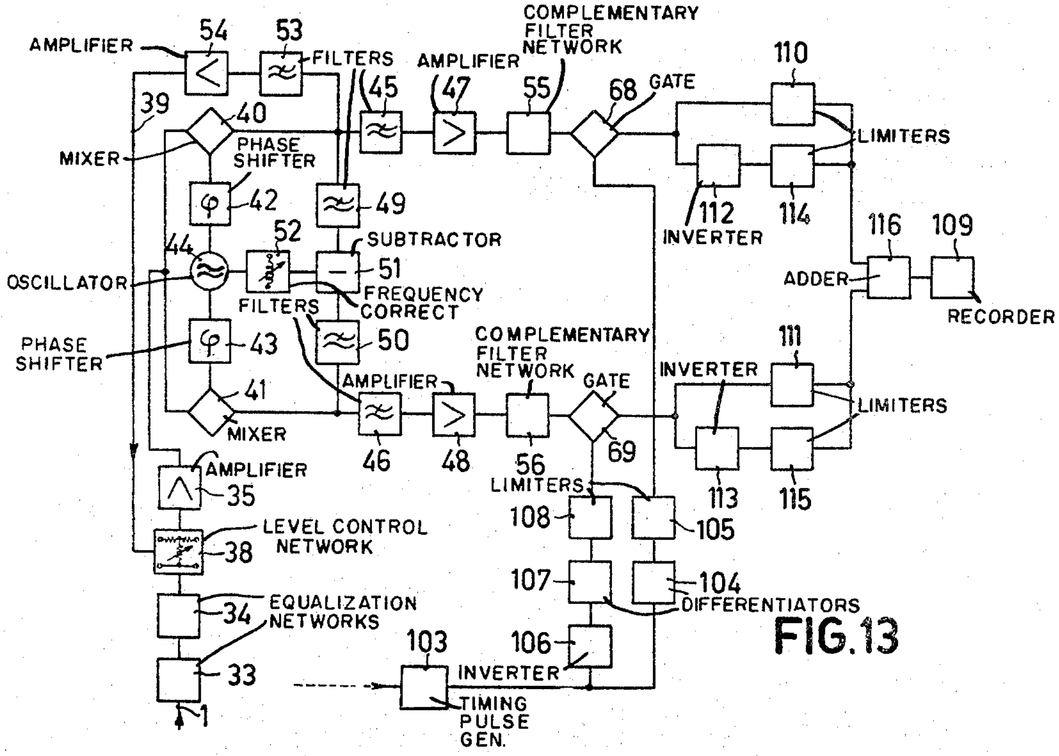

FIGS. 12 and 13 show a transmitting device and a receiving device according to the invention for synchronous telegraphy or pulse-code modulation for the transmission of signals from a single pulse producer and FIGS. 14*a*–14*i* and 15*a*–15*l* show a few time diagrams for explaining the transmitting device and the receiving device of FIGS. 12 and 13.

Figures 1, 2:
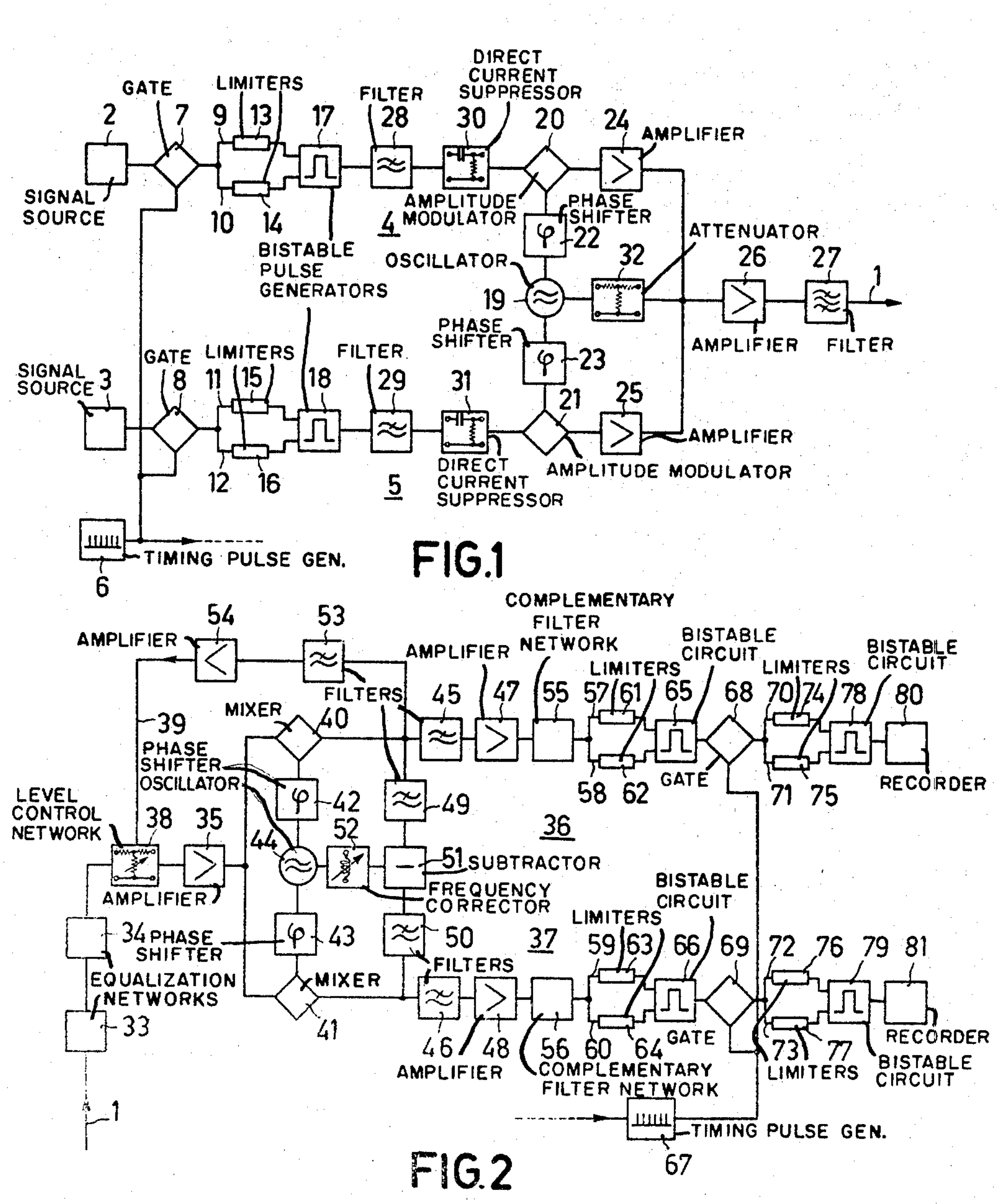

FIG. 1 shows a transmitting device of a pulse transmission system according to the invention for the transmission along a path 1 of synchronous telegraph signals in the speech frequency band, usually the frequency band from 500 to 3200 c./s.; the synchronous telegraph signals are obtained from two signal producers 2, 3, each connected to a transmitter channel 4, 5. The two transmitter channels 4, 5 are of identical structure and are suitable for the transmission of telegraph pulses with a transmission rate of 2250 baud.

In the embodiment shown the two signal producers 2, 3 are formed by a magnetic tape apparatus comprising a timing pulse generator 6, the signals from the signal producers 2, 3 being applied to a gate circuit 7, 8, controlled by the timing pulses and supplying a positive or a negative output pulse at the occurrence of a timing pulse in accordance with the positive or negative value of the signal voltage. The repetition frequency of the equidistant timing pulses from the generator 6 amounts to 2250 c./s.

Figure 3A:
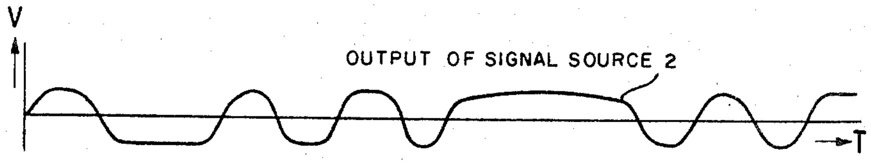
Figure 3B:
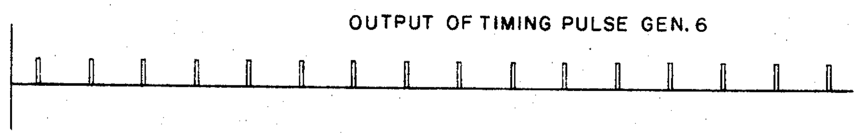
Figure 3C:
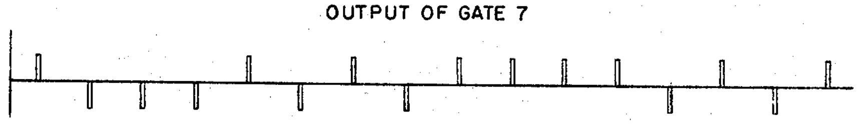

FIG. 3*a* shows the time diagram of the signals to be transmitted from the signal producer 2 and FIG. 3*b* shows the associated timing pulses; the output of the gate circuit 7 has produced at it the pulse sequence indicated in FIG. 3*c*, the polarity of which characterizes the polarity of the signal to be transmitted, the instants of occurrence of which pulses coincide with the equidistant timing pulses. In the same manner the signals from the pulse producer 3 are processed in the gate circuit 8.

Figure 3D:
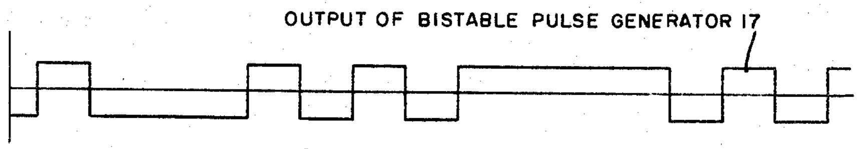

For the transmission of these pulse sequences via the transmitting device the pulses occurring at each of the gate circuits 7, 8 are separated in two parallel-connected channels 9, 10, 11, 12 into positive and negative pulses by a limiter 13, 14; 15, 16 included in said channels and suppressing the positive or negative pulses respectively; in the channel 9, 11 there occur, for example only the positive pulses and in the channel 10, 12 only the negative pulses; these pulses separated according to polarity are applied in the channels 9, 10; 11, 12 to a bistable pulse generator 17, 18, which changes over at the occurrence of a positive pulse into the one stable state and at the occurrence of a negative pulse into the other stable state. The pulse sequence indicated in FIG. 3*d* is thus produced across the output circuit of the pulse generator 17 and a similar pulse sequence is produced across the output circuit of the generator 18, said sequences being used for the transmission in the two transmitting channels 4, 5.

For the transmission of the pulses from the pulse generators 17, 18 via the two transmitting channels 4, 5 via the common transmission conductor 1 each of the transmitting channels 4, 5 is provided with an amplitude modulator 20, 21, connected to a common carrier oscillator 19 and formed by a push-pull modulator, for example a ring modulator, in which modulators 20, 21 the carrier oscillation is modulated with a relative phase shift of 90°. To this end each of the connecting conductors to the amplitude modulators 20, 21 includes a phase shifting network 22, 23 which provides a leading phase of 45° and a lagging phase of 45° respectively of the carrier oscillation. The output voltages of the two amplitude modulators 20, 21 are applied through separation amplifiers 24, 25 and subsequent to amplification and, if necessary, frequency transposition, in a final stage 26 with an output filter 27 to the transmission conductor 1.

Each of the transmitting channels 4, 5 includes a low bandpass filter 28, 29 having a limit frequency of 1350 c./s. for suppressing a spectrum component slightly exceeding half the pulse frequency of 2250/2=1125 c./s. and, moreover, a network 30, 31 suppressing the direct-current component of the pulses and having a limit frequency of for example 50 c./s., corresponding to a time constant of 3.2 msec., which exceeds the duration of the shortest pulse, so that of the telegraph pulses of 2250 baud only the frequency spectrum from 50 to 1350 c./s. is applied to the amplitude modulators for the modulation of the carrier oscillation of, for example, 1850 c./s. The network 30, 31, suppressing the D.C. component of the pulses may be constructed in different ways, for example in the form of a high bandpass filter, which is formed in the embodiment shown by a series capacitor and a parallel resistor, which is shown diagrammatically in the figure.

The carrier oscillator 19 is connected to the input of the final stage 26 through an attenuator 32 for the transmission of a pilot signal of carrier frequency (1850 c./s.), which is transmitted together with the frequency spectra modulated on the carrier, via the transmission conductor 1 to the receiving device for further processing. The modulation process produces at the output of the amplitude modulators 20, 21 particularly sidebands in the frequency regions of 500 to 1800 c./s. and 1900 to 3200 c./s., whilst due to the suppression of the D.C., components of the two pulse sequences in the networks 30, 31 the frequency region of 1800 to 1900 c./s. is free of pulse components in the region of the pilot signal, so that the phase and the amplitude of the latter are not affected by the transmitted pulse components. In the embodiment shown the pilot signal leads by 45° with respect to the carrier oscillation of one pulse sequence and lags by 45° with respect to the other.

In the pulse transmission system described above it is thus ensured that for the transmission of the two pulse sequences of 2250 baud only a frequency band of 2700 c./s. is employed, which corresponds to a pulse information of 1.7 baud per cycle of bandwidth.

Figure 3E:
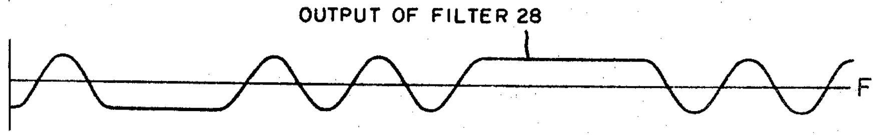

The operation of the transmitting device shown in FIG. 1 will be further explained with reference to the time diagrams shown in FIG. 3. FIG. 3*e* illustrates the pulses at the output of the low bandpass filter 28, the higher frequency components of which are suppressed by the low bandpass filter 28.

Figure 3F:
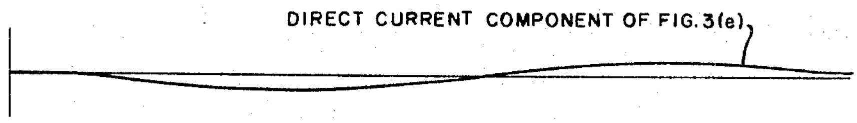

FIG. 3*f* illustrates the slowly varying D.C. component suppressed by the network 30 of the synchronous telegraph pulses, the variation of said component being determined by the variation of the damping and phase characteristic curves in the proximity of the D.C. term. The synchronous telegraph pulses of FIG. 3*g*, which are applied for the transmission via the conductor 1 as a modulation voltage to the amplitude modulators 20, 21, are obtained by subtracting the slowly varying D.C. component of FIG. 3*f* from the pulse sequence of FIG. 3*e*. In a similar manner telegraph pulses from the pulse generator 18 are applied for the modulation of the carrier oscillation to the amplitude modulator 21, whilst the pulse sequencies modulated on the same carrier and originating from the two amplitude modulators 20, 21 are applied to the final stage 26 for further transmission along the conductor 1.

Together with the pulse sequences modulated on the carrier with sidebands in the frequency regions of 500 to 1800 c./s. and 1900 to 3200 c./s., the carrier oscillation is transmitted along the conductor 1 as a pilot signal, which, as stated above, is not affected in its phase and amplitude by the pulse components. It was found that the rigid phase relationship between the pilot signal and the two pulse sequences was maintained in the transmission of said signals along the conductor 1 without any influence from the transmission path and the transmitted pulse signals and, moreover, the suppression of the D.C.

component transposed to the carrier oscillation was completely independent of the transmission path, since investigations have shown that these transmission properties are to be ascribed to the fact that at the area of the carrier frequency in the transmission band and in the immediate proximity thereof the damping curve and the linearity of the phase curve of the transmission conductor 1 are substantially independent of the frequency.

It was thus possible to eliminate substantially the less favourable properties of a speech communication path and to reconstruct at the receiver end the pulse sequences of the pulse producers 2, 3 without distortion and to maintain the very high pulse information rate of 1.7 baud per cycle of bandwidth.

FIG. 2 shows the receiver which co-operates with the transmitter of FIG. 1.

The signals received via the transmission path 1 and consisting of the two amplitude-modulated pulse sequences with side-bands in the frequency regions of 500 to 1800 c./s. and 1900 to 3200 c./s. and the transmitted pilot signal of carrier frequency (1850 c./s.), which leads by 45° with respect to the carrier frequency of one pulse sequence and lags by 45° with respect to that of the other pulse sequence are applied in common via the equalisation networks 33, 34 for the equalisation of the phase and amplitude characteristic curves to a stage 35, in which the incoming signals, subsequent to amplification and, if necessary, frequency transposition, are applied in parallel connection to two receiving channels 36, 37. Between the equalisation networks 33, 34 and the stage 35 there is furthermore provided a variable damping network 38 for level control, the damping of which is controlled in a manner to be described hereinafter by a control-voltage supplied via a conductor 39.

For the demodulation of the separately amplitude-modulated pulse sequences with sidebands lying in the frequency regions of 500 to 1800 c./s. and 1900 to 3200 c./s. each of the receiving channels 36, 37 is provided with a demodulation device 40, 41, formed by mixing stages, for example ring modulators, said demodulators being connected through a network 42, 43 providing a leading phase shift of 45° and a lagging phase shift of 45° respectively, to a common local carrier oscillator 44, the frequency and phase of which are stabilized on the incoming pilot signal. Since the local carrier oscillations supplied through the networks 42, 43 and applied to the demodulation devices 40, 41 are accurately in co-phase with the carrier oscillations associated with the incoming amplitude-modulated pulse sequences, the output circuits of the two demodulation devices 40, 41 have produced at them the demodulated, separate pulse sequences in the frequency regions of 50 to 1350 c./s. which are obtained from a separation amplifier 47, 48 through a low bandpass filter 45, 46 having a limit frequency of for example 1350 c./s.

The filter 45, 46 has a steep damping flank, on the one hand for suppressing interference components in the transmission path and on the other hand for suppressing signal components lying beyond the frequency band and subjected to undesirable phase shifts along the transmission path.

For example the pulses from the transmitting channel 4 appear at the output circuit of the demodulation device 40, whereas the pulses from the transmitting channel 5 appear at the output circuit of the demodulation device 41. Thus a separate demodulation of the two pulse sequences is obtained; they comprise in common a pulse information rate of 1.7 baud per cycle and it was found that the demodulation process was not affected by pulse components and the transmission, which would become manifest by pulse distortions and cross-talk of the modulated pulse sequences. In a practical embodiment the sum of the distortion level and the cross-talk level was less than −26 db with respect to the pulse level, which may be considered to be of no importance for pulse transmission.

The phase stabilisation of the local carrier oscillator 44 required for the demodulation process on the pilot signal of 1850 c./s. is obtained in the device described above by utilising the demodulation devices 40, 41 already employed for demodulation of the amplitude-modulated pulses, each of the output circuits of the demodulation devices 40, 41 having connected to it a low bandpass filter 49, 50, the output voltages of which control a frequency corrector 52, connected to the local carrier oscillator, for example a variable reactance via a subtraction device 51. The frequency of the low bandpass filters 49, 50 is chosen to be lower than the lowest transmitted pulse component.

In this device, in the demodulation devices 40, 41, formed by mixing stages, by mixing of the pilot signal and the local carrier oscillations applied thereto through the networks 42, 43 providing a leading phase shift of 45° and a lagging phase shift of 45° respectively, the outputs of the low bandpass filters 49, 50 have produced across them voltages depending upon the phase relation between said signals and stabilizing the local carrier oscillator 44 accurately on the phase of the pilot signal subsequent to subtraction in the subtraction device 51, through the frequency corrector 52. With the phase stabilization of the local carrier oscillator 44 on the pilot signal the phase differences between the pilot signal and the carrier oscillations in the two mixing stages 40, 41 are equal to 45°, so that also the output voltages of the low bandpass filters 49, 50 are equal and do not give rise to phase readjustment of the local carrier oscillator 44, since these voltages compensate each other in the subtraction device 51. Thus an accurate phase stabilisation of the local carrier oscillator 44 is obtained. If, for example, a phase variation of the local carrier oscillator 44 occurs in the stabilised state, the output voltage of one demodulation device will increase in accordance with the phase variation and that of the other will decrease, so that a control-voltage varying with the value and polarity of said phase variation is obtained by the formation of the difference in the subtraction device 51, which voltage brings the local carrier oscillator 44 back into the stabilised state through the frequency corrector 52.

Not only for the demodulation of the separate pulse sequences and for the phase stabilisation of the local carrier oscillator 44 but also for producing a level control-voltage for controlling the variable damping network 38, use is made of the demodulation devices 40, 41 formed by mixing stages; the value direct voltage produced by mixing local carrier oscillation and the pilot signal in the demodulation devices 40, 41 depends, moreover, on the value of the pilot signal so that at the outputs of the demodulation devices 40, 41 there appear direct voltages directly suitable for level control. In the embodiment shown the direct voltage appearing at the output of the demodulation device 40 is applied as a level control-voltage to the damping network 38 through a low bandpass filter 53 and a separation amplifier 54.

Without interaction this device combines the three functions of demodulation of the separate pulse sequences, the phase stabilisation of the local carrier oscillator 44 and the level control, which means that the device according to the invention provides, in the embodiment shown, the possibility of an appreciable economy in apparatus.

Figure 3G:
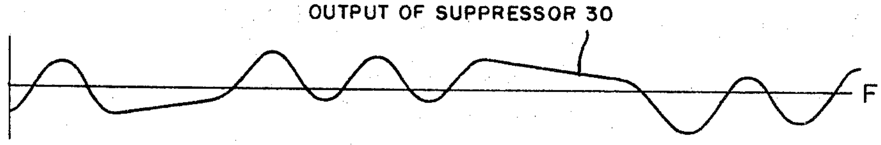
Figure 4A:
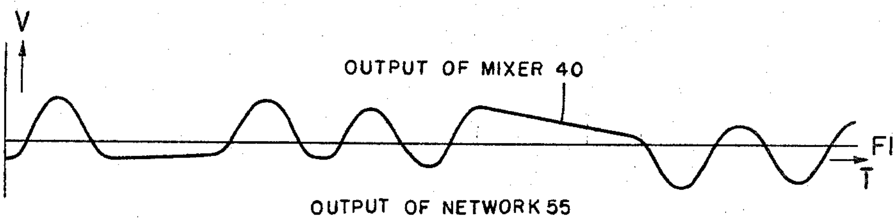

FIG. 4*a* shows in a time diagram the demodulated pulses derived for example from the demodulation device 40, the variation of which pulses corresponds with that of the pulse sequence shown in FIG. 3*g*, the D.C. component being suppressed therein, said sequence being applied at the transmitter end as a modulation voltage to the amplitude modulator. In the same manner the variation of the pulse sequence derived from the demodulation device 41 corresponds with the modulation voltage of the amplitude modulator 21 at the transmitter end.

The fact that the suppression of the D.C. component of the transmitted pulses is substantially not affected by the transmission path 1 permits of recovering accurately the D.C. component suppressed at the transmitter end, after which the transmitted pulses can be reproduced without distortion. To this end in accordance with the United States Patent 3,311,442 the pulses with suppressed D.C. component were applied to a pulse shaper formed by a pulse regenerator, the output circuit of which is coupled through a low bandpass filter with the input circuit. If the time constant of the low bandpass filter is of the same order as the time constant of the network of the transmitting channel, suppressing the D.C. component, the output circuit of the low bandpass filter has produced across it the suppressed D.C. component which is applied subsequent to combination with the output pulses shown in FIG. 4*a* to the amplitude demodulator 40 for pulse regeneration.

For recovering the initial pulse sequences from the demodulated pulses with suppressed D.C. component a different principle is applied in accordance with the present invention; the embodiment is simpler and may be advantageous under certain conditions. In accordance with the invention the pulse signals derived from the amplitude demodulators 40, 41 are applied to a pulse shaper through a complementary network 55, 56, the frequency characteristic curve of which, together with that of the D.C. suppressing network 30, 31, at the transmitter end, behaves, at least up to about half the maximum pulse repetition frequency, like a network formed by a difference subtraction device to which the incoming signals are applied directly and through a delay network, whilst the output signal derived from the output circuit of the complementary network is applied to a pulse shaper having two response values.

Figure 5:
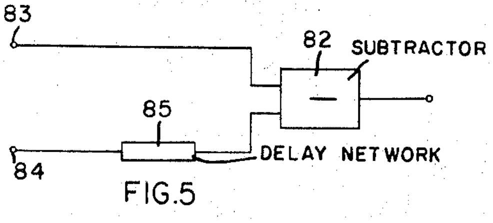

The frequency characteristic curve of the cascade connection of the D.C. suppressing network 30, 31 at the transmitter end and of the complementary network 55, 56 at the receiver end is thus rendered equal, up to half the pulse repetition frequency, to the frequency characteristic curve of the network shown in FIG. 5, formed by a subtraction device 82, to which the incoming signals are applied directly at the input terminal 83 and at the input terminal 84 through a delay network 85. In the embodiment shown the delay time of the delay network 85 is approximately equal to the smallest signal element or else the distance in time between two successive timing instants.

It will now be explained more fully that the special frequency characteristic curve obtained by combining the D.C. suppressing network 30, 31 in the transmitting channel and the complementary network 55, 56 in the receiving channel, brings about a transformation of the shape of the pulses, the regeneration being obtained simply by using the pulse regenerator with two response values.

In order to understand this transformation of the pulse shape in the cascade connection of the D.C., suppressing network 30, 31 and the complementary network 55, 56 it is efficient to start from the network shown in FIG. 5, since owing to the equality of the frequency characteristic curves of the two networks also the transformation of the pulse shape in the two networks is the same. The frequency characteristic curves of the networks need in this case be identical only up to half the pulse repetition frequency, since the spectrum components exceeding half the pulse repetition frequency are suppressed by the low bandpass filter 28, 29 at the transmitter end and by the filter 45, 46 at the receiver end.

If therefore the input terminals 83, 84 of the network of FIG. 5 receive the pulse sequence of FIG. 3*e*, the spectrum components of which, exceeding half the pulse repetition frequency, are suppressed by the low bandpass filters 28, 45, the pulse sequence of FIG. 3*e* is applied at the input terminal 83 directly and at the input terminal 84 by way of delay network 85 to the subtraction device 82 with a delay of two successive timing pulses. These two pulse sequences of the subtraction device 82 are illustrated in FIGS. 6*a* and 6*b* in a time diagram.

Figures 6A, 6B, 6C:
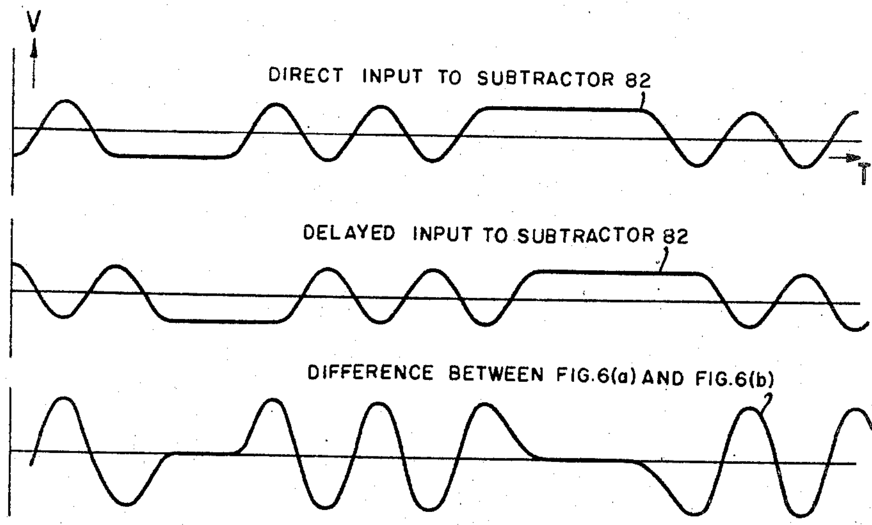
FIGS. 6*a*–6*c* and 9 show the time and frequency diagrams associated herewith.

By formation of the difference between the two pulse sequences of FIGS. 6*a* and 6*b* in the subtraction device 82 the pulse sequence shown in FIG. 6*c* is obtained, which represents the output voltage of the network of FIG. 5 and hence also the output voltage of the complementary network 55 in the receiver, since the frequency characteristic curve of the cascade combination of the D.C. suppressing network 30 and the complementary network 55 is rendered equal to that of the network shown in FIG. 5. For the sake of clarity FIG. 4*b* shows the output voltage of the complementary network 55.

The shape of the pulse sequence thus obtained differs considerably from the initial pulse sequence, but just this transformed pulse sequence is particularly suitable for recovering the initial pulse sequence by using a pulse shaper having two response values. In the embodiment shown the pulse shaper having two response values may be formed by limiters 61, 62; 63, 64 arranged in two parallel connected channels 57, 58; 59, 60 and a bistable pulse generator 65, 66, connected to the output circuits of the limiters 61, 62; 63, 64 and responding when the output voltage of the pulse shaper exceeds one of the response values of the pulse shaper characterized by the levels of the limiters 61, 62; 63, 64.

Figure 4B:
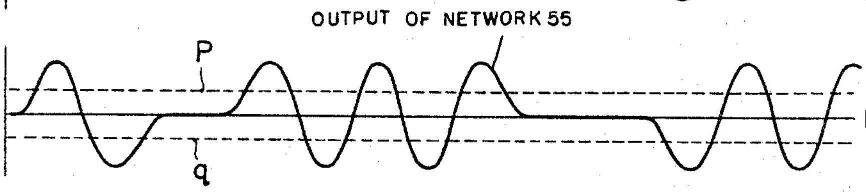
Figure 4C:
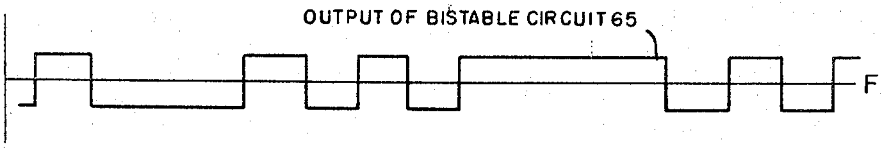

The responsive values of the pulse shaper, which are approximately equal to half the peak value of the applied voltage, are illustrated in FIG. 4*b* by the two horizontal lines $p$ and $q$; at the instants when the applied voltage exceeds the maximum response value $p$ in a positive sense, the bistable pulse generator 65 will change over from one stable state to the other stable state and when the lower response value $q$ exceeds in the negative sense it will change over to the initial stable state. This results in the pulse sequence shown in FIG. 4*c*, the shape of which corresponds substantially to the initial pulse sequence of FIG. 3*d* and which can be applied to the recording apparatus 80, 81.

In this simple manner the two pulse sequences of 2250 baud transmitted through the two transmission channels in a frequency band of only 2700 c./s. were recovered without the sequences affecting each other. Not only by this very high pulse information rate of 1.7 baud per cycle of bandwidth but also by a particularly simple structure the transmission system shown is distinguished from others, whilst it was assessed in practice that a particularly advantageous discrimination of the most critical pulse patterns from resulting noise could be obtained.

Particularly with synchronous telegraphy the transmission system shown is advantageous. Owing to the transformation of the pulse shape given pulses of the regenerated pulse sequence exhibit a slight deformation in duration, but with synchronous telegraphy this can be completely eliminated by using pulse regeneration in accordance with the instants of occurrence, since with synchronous telegraphy the transmitted pulses are derived from a sequence of equidistant timing pulses.

For this pulse regeneration in accordance with the instants of occurrence the embodiment shown comprises, after the bistable pulse generator 65, 66, a gate circuit 68, 69, controlled by a timing pulse generator 67 and supplying a positive output pulse at the occurrence of a positive output voltage of the bistable pulse generator 65, 66 and a negative output pulse at the occurrence of a negative output voltage. In the manner described with reference to the transmitting device of FIG. 1 the positive and negative output pulses of the gate circuits 68, 69 are applied to a bistable pulse generator 78, 79 in two parallel connected channels 70, 71; 72, 73 including limiters 74, 75; 76, 77; at the occurrence of a positive pulse said generator changes over to one stable state and at the occurrence of a negative pulse it changes over to the other stable state. The output voltage of the bisable pulse generator 78, 79 is applied to the recording apparatus 80, 81.

The timing pulse generator 67 is accurately synchronised in phase by the timing pulse generator 6 at the transmitter end in a manner irrelevant for the present invention; this synchronisation may be carried out in a manner commonly used in pulse code modulation, or a separate transmission channel may be employed.

Figure 4D:
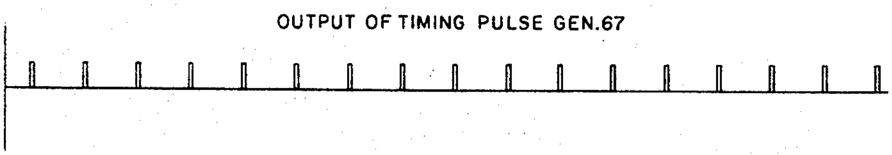
Figure 4E:
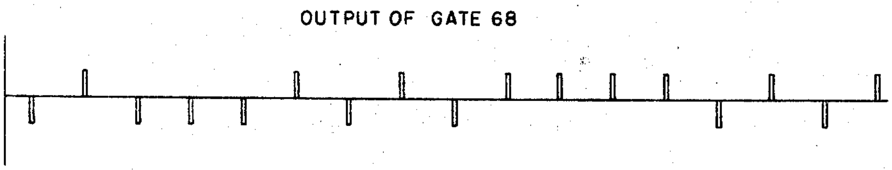
Figure 4F:
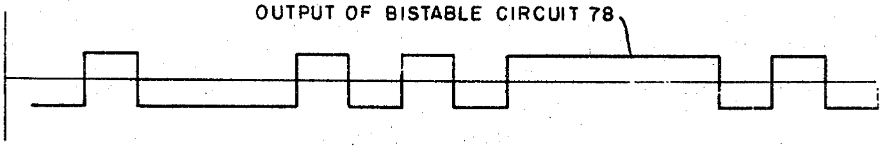

This pulse regeneration in accordance with the instants of occurrence is explained with reference to the time diagrams of FIGS. 4*d* to 4*f*; FIG. 4*d* illustrates the equidistant timing pulses from the timing pulse generator 67 and the pulses shown in FIG. 4*e* are produced at the gate circuit 68; said pulses are applied, subsequent to conversion in the pulse generator 78 into the pulse sequence of FIG. 4*f* to the recording apparatus 80. In the same manner the signals from the pulse generator 66 are processed.

Instead of using the bistable pulse generators 78, 79 for pulse regeneration, use may be made of pulse generators formed by monostable pulse generators which supply an output pulse of the desired width when a given amplitude level of the applied pulses is exceeded. It is not necessary in this case for the gate circuits 68, 69 to supply pulses of different polarities; these circuits may be constructed so that only pulses of one polarity are supplied.

In the embodiment according to the invention the transmission of the extremely high pulse information rate of 1.7 baud per cycle of bandwidth was carried out in a simple manner by using suitable transformation of the pulse shape in conjunction with the use of a pulse shaper having two response values, whilst the influence of the transmission path is substantially suppressed.

In order to obtain the desired transformation of the pulse shape, there must be an intimate relationship between the frequency characteristic curve $\varphi_1(\omega)$ of the D.C. component suppressing network 30, 31 and the frequency characteristic curve $\varphi_2(\omega)$ of the complementary network 55, 56. As stated above, the frequency characteristic curve of the cascade connection of the D.C. component suppressing network 30, 31 and the complementary network 55, 56 is equal up to half the maximum pulse repetition frequency $\omega_m/2$ to the frequency characteristic curve $\varphi_3(\omega)$ of the network of FIG. 5 formed by a subtraction device 82, to which are applied the incoming signals directly and via delay network 85 having a delay time $\tau$.

It can be derived mathematically that the transmission characteristic curve $\varphi_3(\omega)$ of the network of FIG. 5 has the form:

$$\varphi_3(\omega)=2e^{j(\pi/2-\omega\tau/2)}\sin\omega\tau/2 \qquad (1)$$

or else the frequency characteristic curves $\varphi_1(\omega)$ and $\varphi_2(\omega)$ of the D.C. component suppressing network 30, 31 and the complementary network 55, 56 have the relationship:

$$\varphi_1(\omega)\times\varphi_2(\omega)=2e^{j(\pi/2-\omega\tau/2)}\sin\omega\tau/2 \qquad (1)$$

It has been found that this condition of the relationship between the characteristic curves $\varphi_1(\omega)$ and $\varphi_2(\omega)$ can be fulfilled with the aid of particularly simple networks. If the D.C. component suppressing network 30, 31 is formed by the network shown in FIG. 7 consisting of the series capacitor 86 and a parallel resistor 87, the complementary network 55, 56 is formed by the network of FIG. 8, consisting of a series capacitor 89, shunted by a resistor 88, and a parallel resistor 90. If the delay time $\tau$ is equal to the distance in time between two successive timing pulses, the following data apply to said networks.

Figure 7:
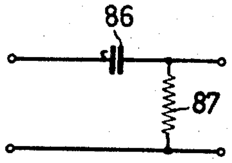
FIGS. 5, 7 and 8 show in detail a few networks for use in a pulse transmission system according to the invention

For the network in FIG. 7:
- Capacitor 86: 3$\mu$f.
- Resistor 87: 1K ohm.

Figure 8:
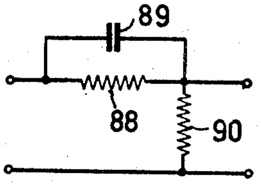

For the network of FIG. 8:
- Capacitor 89: 3 $\mu$f.
- Resistor 88: 1K ohm.
- Resistor 90: 80 ohms.

Figure 9:
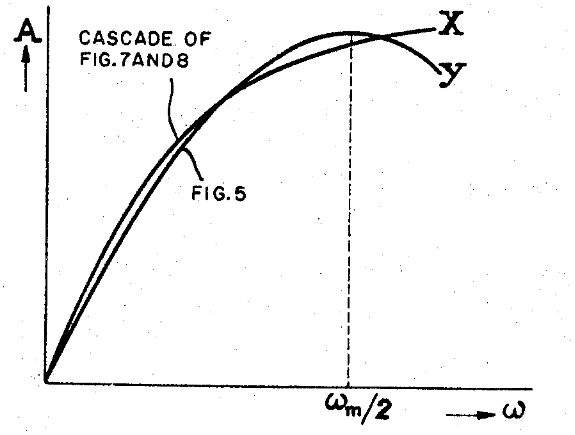

In FIG. 9 the curve X indicates the amplitude characteristic curve relative to the frequency characteristic curve of the cascade circuit of the networks of FIGS. 7 and 8 and the curve Y indicates the amplitude and frequency curves of the network of FIG. 5. From FIG. 9 it will be seen that the curve X of the cascade circuit of the simple networks of FIGS. 7 and 8 follows up to half the maximum pulse repetition frequency $\omega_m/2$ fairly accurately the curve Y of the network of FIG. 5; only beyond half the maximum pulse repetition frequency $\omega_m/2$ these two curves X and Y diverge from each other, which is unobjectionable, since the pulse components exceeding half the pulse repetition frequency are suppressed drastically by the low band-pass filters 28, 29 and 45, 46.

In order to obtain the desired frequency characteristic curves the D.C. suppressing network 30, 31 and the complementary network 55, 56 may also be formed by networks of different types. The D.C. component suppressing network 30, 31 may be formed by a series resistor and a parallel coil; this involves a complementary network 55, 56 formed by a series resistor and a parallel impedance consisting of the series combination of a resistor and a coil. The desired frequency characteristic curve may, if desired, be obtained already by the D.C. component suppressing network 30, 31, in which case the complementary network 55, 56 must have a frequency-independent behaviour up to half the pulse repetition frequency.

From the frequency diagram of FIG. 9 it will be apparent that by the transformation of the pulse shape the transmission of the higher frequency components of the pulse spectrum has greater preference with respect to the lower frequency components of the pulse spectrum, which are located in the proximity of the pilot signal in the transmission along the conductor 1. If the transformation of the shape is carried out mainly or as a whole in this way at the transmitter end, the device according to the invention provides the important advantage that the effect of said lower frequency components of the pulse spectrum is considerably reduced in the selection of the demodulated pilot signal in the low bandpass filters 49, 50 for the frequency control and in the low bandpass filter 53 for the level control. Without disturbing effects it is thus possible to choose the limit frequency of the low bandpass filters 49, 50 and 53, respectively, higher, so that a more rapid frequency and level control is obtained for the readjustment of more rapid frequency and level variations. The limit frequencies of the low bandpass filters 49, 50 and 53 may be raised by a factor 10.

For the sake of completeness it should be noted that it is not necessary to render the delay time $\tau$, which determines the frequency characteristic curve of the cascade circuit of the D.C. component suppressing network 30, 31 and the complementary network 55, 56 accurately equal to the distance in time between two successive timing pulses; this delay time may have a different value, for example half the distance in time between two successive timing pulses. However, the use of a delay time equal to the distance in time between two successive timing pulses has the advantage, as stated above, that an optimum signal-to-noise ratio is obtained.

Figures 10, 11A, 11B, 11C, 11D:
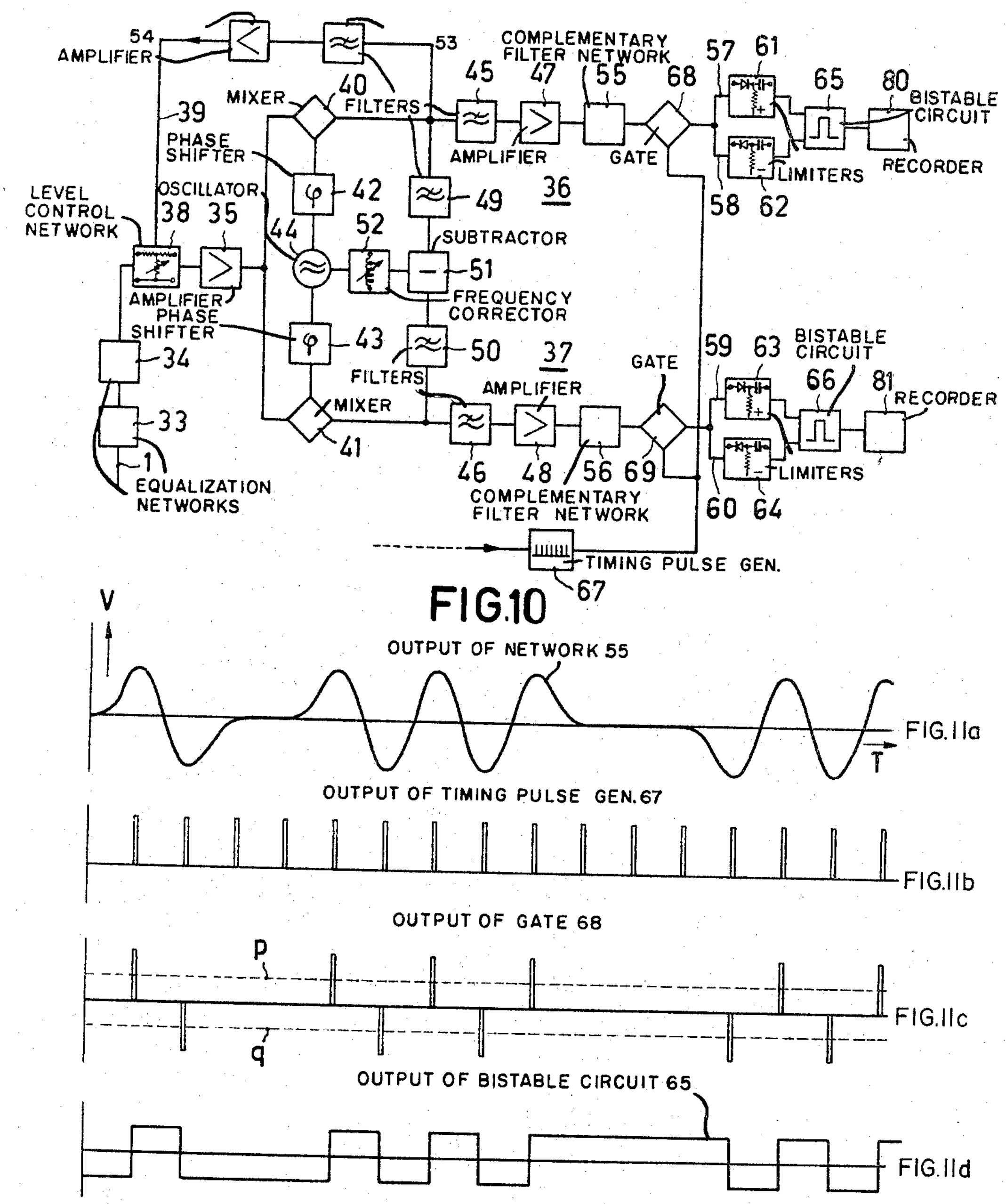
FIG. 10 shows a simplification of the receiving device of FIG. 2
FIGS. 11*a*–11*d* shows a time diagram for explaining the receiver of FIG. 10.

FIG. 10 shows a variation of the receiver shown in FIG. 2; corresponding elements are designated by the same reference numerals.

In this receiver the structure is considerably simplified by utilizing the particular properties of the transformation of the pulse shape by the cascade circuit of the D.C. suppressing network 30, 31 and the complementary network 55, 56, resulting in that the peaks of the transformed pulse voltage accurately coincide with the instance of occurrence of the timing pulses. Owing to this property the output voltage of the complementary network 55, 56 can be applied without pulse regeneration directly to the gate circuit 68, 69, which is at the same time controlled by the timing pulses. Similarly to the gate circuits 68, 69 of FIG. 2 said gate circuits are constructed so that with a positive input voltage a positive output pulse is produced and with a negative input voltage a negative output pulse is obtained.

FIG. 11*a* shows the output voltage of the complementary network, the shape of which is equal to the output voltage of FIG. 4*b* of the complementary network 55 of FIG. 2 and FIG. 11*b* shows the periodic timing pulses; FIG. 11*c* illustrates the pulse sequence produced at the output of the gate circuit 68 of FIG. 10. In FIG. 11*c* the two horizontal lines *p* and *q* indicate the two response values of the pulse shaper and the pulses exceeding the response values *p* and *q* of the pulse shaper produce, in the bistable pulse generator 65, the pulse sequence shown in FIG. 11*d*, which similar to the pulse sequence of FIG. 4*f*, corresponds accurately with the initial pulse sequence of FIG. 3*d*.

This results in a striking simplicity of the structure of the transmission apparatus thus obtained suitable for the transmission of the extremely high pulse information rate of 1.7 baud per cycle of bandwidth.

FIGS. 12 and 13 show a further transmitting and receiving device according to the invention for synchronous telegraphy or pulse code modulation, said system being suitable for the transmission of pulses of only one signal source 91 with double the pulse rate of 4500 baud instead of the transmission of the pulse signals from two separate signal sources, each with a transmission rate of 2250 baud.

Figure 14A:
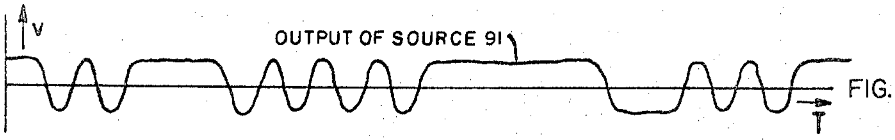
Figure 14B:
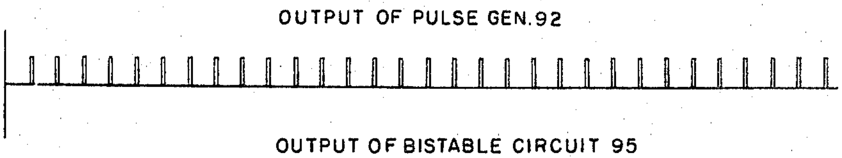

The signals from the signal source 91 are transmitted through the two transmitting channels 4, 5 of FIG. 12; FIG. 14*a* shows by way of example the signal to be transmitted and FIG. 14*b* shows the equidistant timing pulses from the associated timing pulse generator 92, having a repetition frequency of 4500 c./s.

Figure 14C:
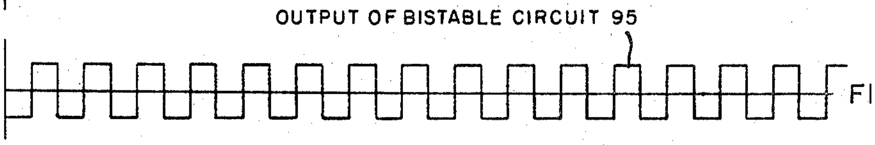
Figure 14D:
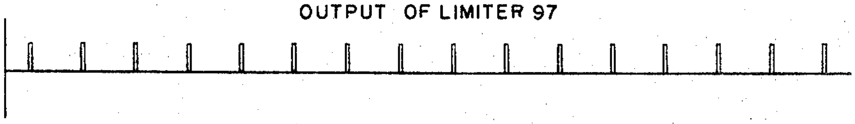
Figure 14E:
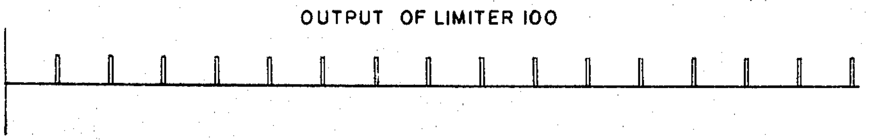

In the embodiment shown the signals from the signal source 91 are applied to two parallel-connected channels 4, 5, each of which includes a gate circuit 93, 94, controlled alternately by timing pulses from the timing pulse generator 92. To this end the timing pulses from the generator 92 (FIG. 14*b*) are applied to a bistable pulse generator 95, which passes at the occurrence of a timing pulse from one stable state to the other stable state, so that the pulse sequence of FIG. 14*c* is obtained and by differentiation in the differentiating network 96 and by subsequent limitation of the negative pulses in a limiter 97 the gate pulses are obtained for the gate circuit 93, whilst the pulses for the gate circuit 94 are obtained by applying the pulse sequence of FIG. 14*c* through a phase inverting stage 98 to the cascade circuit of a differentiating network 99 and a limiter 100. In this manner the outputs of the limiters 97 and 100 have produced at them the pulses for the gate circuits 93, 94, illustrated in FIGS. 14*d* and 14*e*.

Figure 14F:
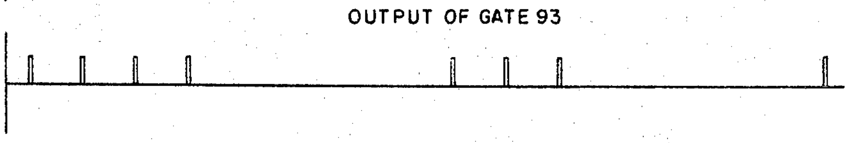
Figure 14G:
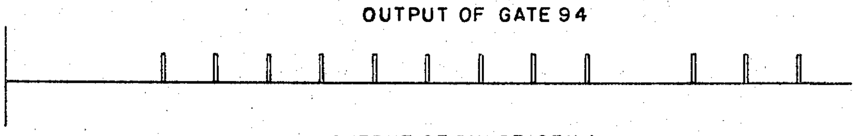

A pulse is alternately applied to the gate circuit 93 and to the gate circuit 94, which circuits are adjusted so that a pulse is allowed to pass only with a positive signal voltage, so that the pulse sequences of FIGS. 14*f* and 14*g* are produced at the outputs of the gate circuits 93, 94.

Figure 14H:
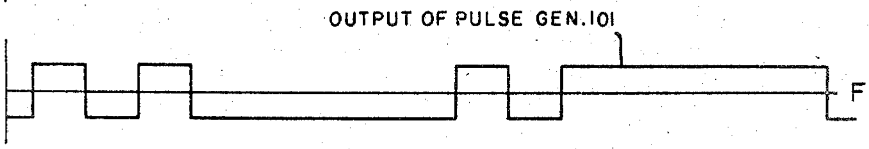
Figure 14I:
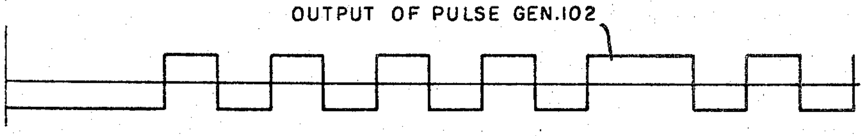

For the transmission through the two transmitting channels 4, 5 each of the two pulse sequences of FIGS. 14*f* and 14*g* is applied to a pulse generator 101, 102, which passes at the occurrence of a positive pulse from one stable state to the other stable state for producing the pulse sequences of FIGS. 14*h* and 14*i* which are transmitted in the manner described above to the receiving device. The two pulse sequences have half the transmission rate of the initial signal of FIG. 14*a*, i.e. 2250 baud. The flanks of the transmitted pulse sequences of FIGS. 14*h* and 15*i* are characteristic of a positive signal voltage from the signal source 91 at the occurrence of a gate pulse.

In the receiving device of FIG. 13 co-operating with the transmitting device of FIG. 12 the demodulated signals are applied to the complementary networks 55, 56, from which, as stated above, the transformed pulse sequences are derived in the manner described. FIGS. 15*a* and 15*b* illustrate the voltages at the complementary networks 55, 56.

In the same manner as in the receiving device of FIG. 10 the output voltages of the complementary networks 55, 56 are applied to the gate circuits 68, 69, the pulses of which are derived from a timing pulse generator 103, which is accurately stabilised in phase by the pulse generator 95 at the transmitter end for producing the voltage of FIG. 15*c*, which corresponds with the voltage of FIG. 14*c*. By differentiation in the differentiating network 104 and by subsequent limitation of negative pulses in the limiter 105 the gate pulses for the gate circuit 68 are produced, whereas the pulses for the gate circuit 69 are obtained by applying the output pulses of the pulse generator 103 though a phase inverting stage 106 to a differentiating network 107 with a subsequent limiter 108 for suppressing the negative pulses. FIGS. 15*d* and 15*e* illustrate the gate pulses thus produced for the gate circuits 68 and 69.

With respect to structure and operation the gate circuits are completely identical to those of FIG. 10; in the manner described with reference to said figure the pulse sequences of FIGS. 15*f* and 15*g* are produced at the outputs of the gate circuits 68 and 69.

For further processing the pulse sequences of FIGS. 15*f* and 15*g* in the recording apparatus, each of these pulse sequences is applied to a pulse shaper having two response values, each shaper being formed by the parallel combination of a limiter 110, 111 and the cascade circuit of a phase inverting stage 112, 113 and a limiter 114, 115, whilst the response values indicated by the limiter levels in the various limiters 110, 111, 114, 115 are equalised, which is illustrated in FIGS. 15*h* and 15*i* by the broken horizontal lines. The limiters 110, 111 only pass the positive pulses exceeding the response value and the limiters 114 and 115 pass only the phase-inverted negative pulses, whilst the pulse sequences of FIGS. 15*j* and 15*k* appear at the outputs of the pulse shapers 110, 112, 114 and 111, 113, 115. The addition of the two pulse sequences of FIGS. 15*j* and 15*k* in the adding device 116 supplies the pulse sequence of FIG. 15*l*, the pulses of which, characterizing, as stated above, a positive signal voltage of the signal voltage source 91, are applied to the recording apparatus 109.

As stated with reference to the above-mentioned embodiment it is not necessary to use a pulse regenerator at the receiver end; it is sufficient to use the pulse shapers 110, 112, 114 and 111, 113, 115, which pass the pulse sequences of FIGS. 15*j* and 5*k*; since these pulse sequences contain all the information of the pulse sequences of FIGS. 14*h* and 14*i*.

Finally it should be noted that it is possible to arrange the D.C. component suppressing network in the form of a blocking filter after the modulators 20, 21 and in a similar manner the frequency-transformed, complementary network in front of the demodulators 40, 41.

What is claimed is:

1. A transmission system for pulses which occur at equidistant timing instants, comprising a transmitter, a receiver, and a transmission path interconnecting said transmitter and receiver, said transmitter comprising first and second transmitter signal channels, a source of carrier oscillations, means for modulating said carrier oscillations with the outputs of said first and second transmitter signal channels with a mutual phase displacement of 90 degrees, and means for applying said modulated oscillations to said path, at least said first transmitter channel comprising a network which suppresses the direct current component of pulse signals passing therethrough; said receiver comprising first and second receiver signal channels, means connected to said path for demodulating received signals and applying demodulated signals corresponding to the signals of said first and second transmitter channels to said first and second receiver channels respectively, each of said receiver channels further comprising pulse shaping means, and means applying said demodulated signals to the respective pulse shaping means, said means applying the said signals to the pulse shaping means of said first receiver channel comprising a filter network, the cascaded frequency characteristic of said suppression network and filter network being substantially the equivalent of the frequency characteristic of a subtraction circuit having input signals applied thereto both directly and by way of a delay network, at least up to half the pulse repetition frequency of said pulses which occur at equidistant timing instants.

2. The system of claim 1 in which said pulse shaping means in said first receiver channel comprises bistable circuit means, and is responsive to change stable states at two different amplitudes of signals applied thereto.

3. A transmission system for pulses which occur at equidistant timing instants, comprising a transmitter, a receiver, and a transmission path interconnecting said transmitter and receiver, said transmitter comprising first and second transmitter signal channels, a source of carrier oscillations, means for modulating said carrier oscillations with the outputs of said first and second transmitter signal channels with a mutual phase dipslacement of 90 degrees, and means for applying said modulated oscillations to said path, at least said first transmitter channel comprising a network which suppresses the direct current component of pulse signals passing therethrough; said receiver comprising first and second receiver signal channels, means connected to said path for demodulating received signals and applying demodulated signals corresponding to the signals of said first and second transmitter channels to said first and second receiver channels respectively, each of said receiver channels further comprising pulse shaping means, and means applying said demodulated signals to the respective pulse shaing means, said means applying the said signals to the pulse shaping means of said first receiver channel comprising a filter network, the frequency characteristic $\varphi_1(\omega)$ of said suppression network and the frequency characteristic $\varphi_2(\omega)$ of said filter netwrk being substantially related by the expression:

$$\phi_1(\omega)\times\phi_2(\omega)=2e^{j\left(\frac{\pi}{2}-\frac{\omega\tau}{2}\right)}\sin\frac{\omega\tau}{2}$$

at least up to half the repetition frequency of said timing instants.

4. A transmission system for pulses which occur at equidistant timing instants, comprising a transmitter, a receiver, and a transmission path interconnecting said transmitter and receiver, said transmitter comprising first and second transmitter signal channels, a source of first and second pulse signals, means applying said first and second signals to said first and second transmitter channels respectively, a source of carrier oscillations, means for amplitude modulating said carrier oscillations with the outputs of said first and second transmitter channels with a mutual phase displacement of 90 degrees, means providing pilot oscillations of the frequency of said carrier oscillations, and means applying said modulated oscillations and pilot oscillations to said path, each of said transmitter channels including network means for suppressing the direct current component of pulse signals applied thereto; said receiver comprising first and second receiver signal channels, each of said receiver channels comprising demodulator means, means connecting each demodulator means to said path, means providing a local carrier oscillation synchronized with said carrier oscillations, means applying said local oscillations to said demodulator means for demodulating the signals applied to said first and second receiver channels whereby the outputs of the demodulator means of said first and second receiver channels correspond to the signals of said first and second transmitter channels respectively, each receiver channel further comprising a filter network, bistable pulse shaping means, and means connecting said filter network between the respective demodulator means and bistable pulse shaping means, the cascaded frequency characteristic of each suppression network means and the corresponding filter network being substantially the equivalent of the characteristic of a subtraction network having one input to which signals are applied directly and another input to which said last mentioned signals are applied by way of a delay means, at least up to half the repetition frequency of said timing instants.

5. The system of claim 4 in which the frequency characteristic $\varphi_1(\omega)$ of said suppression network means and the frequency characteristic $\varphi_2(\omega)$ of said filter networks are related by the expression:

$$\phi_1(\omega)\times\phi_2(\omega)=2e^{j\left(\frac{\pi}{2}-\frac{\omega\tau}{2}\right)}\sin\frac{\omega\tau}{2}$$

6. The system of claim 4 in which the delay time of said delay means is substantially equal to the time between successive timing instants.

7. The system of claim 4 wherein said suppression network is comprised of a series capacitor and a shunt resistor, and said filter network is comprised of a series branch of a capacitor in parallel with a resistor, and a shunt branch of a resistor.

8. The system of claim 4 comprising low pass filter means for connecting each demodulator means to the respective filter network, said filter means having a frequency characteristic that suppresses spectrum components substantially exceeding half the repetition frequency of said pulse signals.

9. The system of claim 4 in which said bistable pulse shaping means comprises a parallel circuit of first and second limiters having limiting values of opposite polarity, a bistable pulse generating means connected to one end of said parallel circuit, and means applying the output of said filter network to the other end of said parallel circuit, whereby said bistable circuit passes to one stable state in response to an output from said first limiter and passes to a second stable state in response to an output from said second limiter.

10. The system of claim 4 in which said means connecting said filter network to said bistable pulse shaping means comprises gate means, comprising a source of timing pulses synchronized with said timing instants, and means applying said timing pulses to said gate means as a control signal.

11. The system of claim 10 in which said means applying said first and second signals to said first and second transmitter channels comprises gate means, bistable pulse generating means connected to the output of said last mentioned gate means, a source of timing pulses occurring at said timing instants, and means applying said last mentioned timing pulses to said last mentioned gate means as a control signal.

References Cited

UNITED STATES PATENTS

| | | | |
|---|---|---|---|
| 3,031,529 | 4/1962 | Colodny | 179—15 |
| 3,123,670 | 3/1964 | Kaenel | 178—66 |

ROBERT L. GRIFFIN, *Primary Examiner.*

JOHN W. CALDWELL, *Examiner.*

J. T. STRATMAN, *Assistant Examiner.*